United States Patent [19]

Connolly et al.

[11] 4,249,863
[45] Feb. 10, 1981

[54] SURFACE AERATOR IMPELLER

[75] Inventors: John R. Connolly, Paoli; David E. Gibson, Ft. Washington; Edward L. Heimark, King of Prussia; Jerome B. Quinn, Kennett Square; Richard E. Speechley, Willow Grove; Richard L. Winter, Berwyn, all of Pa.

[73] Assignee: Philadelphia Gear Corporation, King of Prussia, Pa.

[21] Appl. No.: 28,527

[22] Filed: Apr. 9, 1979

Related U.S. Application Data

[62] Division of Ser. No. 825,486, Aug. 17, 1977, Pat. No. 4,163,631.

[51] Int. Cl.³ .............................................. B01F 3/04
[52] U.S. Cl. .................................. 416/185; 416/202; 261/91
[58] Field of Search ............... 416/185, 202, 237, 188; 261/91

[56] References Cited

U.S. PATENT DOCUMENTS

| | | | |
|---|---|---|---|
| 1,325,591 | 12/1919 | Steckler | 416/185 |
| 1,427,391 | 8/1922 | Johns | 416/185 X |
| 1,814,709 | 7/1931 | Koenig | 416/185 |
| 2,294,135 | 8/1942 | Smith | 416/188 |
| 2,712,412 | 7/1955 | West | 416/185 X |
| 3,246,882 | 4/1966 | Clough | 416/185 X |
| 3,339,897 | 9/1967 | Davis | 416/202 X |
| 4,163,631 | 8/1979 | Connolly et al. | 416/185 |

FOREIGN PATENT DOCUMENTS

| | | | |
|---|---|---|---|
| 617318 | 3/1961 | Canada | 416/185 |
| 644600 | 10/1928 | France | 416/185 |
| 166388 | 3/1959 | Sweden | 416/212 R |
| 1402400 | 8/1975 | United Kingdom | 416/185 |
| 316409 | 11/1971 | U.S.S.R. | 416/188 |

Primary Examiner—Everette A. Powell, Jr.
Attorney, Agent, or Firm—Paul & Paul

[57] ABSTRACT

Several forms of surface impeller for aeration of liquids are disclosed. All of the forms are of the shrouded or closed turbine type. In one form, the impeller has a large-diameter flat steel horizontal upper disc adapted to be secured to the lower end of a vertically disposed rotatable drive shaft. Secured, as by welding, to the undersurface of the upper disc are a plurality, such as six or eight or other number, of vertical blades at uniform spacing. Each blade is curved in a retreating or backward direction relative to the direction of rotation of the impeller. Each blade has a long or deep vertical inner edge located forward of the center axis of rotation. The lower edge of each blade is inclined upwardly toward a relatively short or shallow vertical outer edge located near the outer periphery of the upper disc. The horizontal innermost portion of the otherwise inclined bottom edge of each blade is welded to a small lower tie plate. The long vertical inner edge of each blade is welded continuously to the face of the next proceeding blade, thereby to form a hollow hexagonal liquid-tight chamber extending along the axis of rotation from the upper disc to the lower tie plate. The upper disc has reinforcing angle irons disposed in a hexagonal configuration welded to its upper surface. In another form, the blades are reverse curved, with only the inward portions of the blades being curved in a retreating or backward direction relative to the direction of rotation of the impeller, the outward portions being curved in the forward direction and extending well beyond the periphery of the upper disc. In yet another form, which is a preferred form for some purposes, the blades are not curved. They are flat and of rectangular cross section, and they are disposed in a backward direction relative to the direction of rotation of the impeller.

4 Claims, 11 Drawing Figures

SURFACE AERATOR IMPELLER

This is a division of Application Ser. No. 825,486, filed 8/17/77, now U.S. Pat. No. 4,163,631, granted 08/07/79.

BACKGROUND OF THE INVENTION

The present invention relates to surface agitators for aerating liquids, and particularly to agitators of the type useful in the treatment of sewage and other waste water streams.

Mass transfer between gases and liquids is a very fundamental physical mechanism, similar in principle to the flow of electricity and the flow of heat. In chemical processes, mass transfer between gases and liquids can simply involve the physical transfer of one material into the other material up to the saturation value, at which point transfer stops. Or, it can also include a chemical reaction occurring between the dissolved material in the second material, after the basic mass transfer has occurred. In such a case, mass transfer will continue until no more reaction occurs.

An extremely important mass transfer is involved in the treatment of sewage and other wastewater streams. The basic process is known as the activated sludge process, which was discovered or invented about fifty years ago. It is a biochemical type of reaction, involving the mass transfer of oxygen to water, and then the transfer of that dissolved oxygen to support the growth of a microorganism being suspended in water. These microorganisms, known as the biomass, work on the waste stream in different ways, depending on what it is, to eliminate the so-called bacteriological oxygen demand (BOD).

The original activated sludge process involved introducing air from a blower through various forms of diffuser devices located in the bottom of the basin. These devices generally have low oxygen-transfer efficiency and poor solids-suspension characteristics.

About twenty-five years ago, a different approach was taken to aeration in the activated sludge proces. This different approach was known as mechanical surface aeration. This consisted of a mechanical agitator operating at the liquid surface to throw liquid into the air and to induce absorption of air into the liquid, without the use of a compressor and the diffusers. Since that time, a fairly large number of different designs for surface aerator impellers have been introduced, both for the purpose of increasing the oxygen-transfer efficiency and also, secondarily, if possible, to improve the solids suspension. The problem of solids suspension, however, has an obvious limitation because of the remoteness of the impeller from the tank bottom where the solids tend to accumulate.

The oxygen-transfer efficiency for surface aerator mechanisms ranges from 2.0 to 4.0 pounds of oxygen per hour per horsepower in the larger sizes. In the smaller sizes, the efficiency values are usually higher. Since electricity is one of the main operating costs in such a plant, the oxygen-transfer efficiency value is extremely important.

Over the years, surface aerators in general have unfortunately been plagued with an unusual amount of mechanical breakdown problems. In general, these have been due to erratic loading characteristics of the various types of surface aerator impellers on the market, which cause unusually high shock loads through the power transmission train. These have generally resulted in gear failures, although other failures, such as bearing failures and shaft failures, have also occurred. Some surface aerator impellers are characterized by instantaneous power load swings of 25 to 50 percent. These are apparently due to a combination of collapsing vortexes, plus the phenomenon of the blade jumping from liquid to gas and back to liquid again because of close proximity to a violently agitated liquid surface. Aerator developers have attempted to create an aerator design which would give a more uniform transmission of load and avoid failures due to shock loading, but generally the efforts have not been very successful.

Another major problem associated with surface aerators is the problem of misting and subsequent ice formation in cold climates. It has been noted that some surface aerators create more mist than others, and the subsequent formation of ice can result in serious damage to the equipment. In addition, more recently, concern has developed about this misting resulting in aerosol type transport of harmful bacteria to neighborhoods adjacent to the sewage treatment plant. Currently, the question of misting is becoming of increasing concern regardless of the nature of the climate where the plant is located. Surface aerator manufacturers and consulting engineers have attempted to control misting by the use of shields located above the plume of the impeller. However, this does not directly control the formation of mist; it simply diverts that mist from impingement on the immediate platform area.

Another operating difficulty with some surface aerator designs is the problem of large floating material, such as rags, getting caught on the complicated impeller configurations and creating mechanical unbalance leading to mechanical failures. Unfortunately, in general, those surface aerator impellers which have a high oxygen-transfer efficiency are also of very complex design and are prone to this kind of problem.

SUMMARY OF THE INVENTION

An object of the present invention is to provide an improved apparatus for mechanical surface aeration of a liquid.

Another object is to obtain a high level of oxygen transfer efficiency in terms of pounds of oxygen transfer per hour per unit of horsepower consumption.

Another object is to provide not only for a high discharge capacity of liquid into the air, but also of recirculation of the liquid for the purpose of solids suspension, such as to maintain sewage solids in suspension in the activated sludge process for treatment of sewage.

Another object is to provide an apparatus design which minimizes misting while achieving a high level of oxygen transfer efficiency.

Another object is to provide an impeller having the capability of achieving the foregoing objectives and which is effective at both low and high speeds of operation and at different liquid levels.

The foregoing objects are achieved by a surface aerating impeller of the shrouded or closed turbine type having a large diameter flat top disc to the undersurface of which a plurality of impeller blades are secured at uniformly spaced separation.

DETAILED DESCRIPTION OF THE PREFERRED EMBODIMENTS

The impeller of FIGS. 1-4 will be described first. This form of impeller is particularly suited for single-speed operation.

Figure 1:
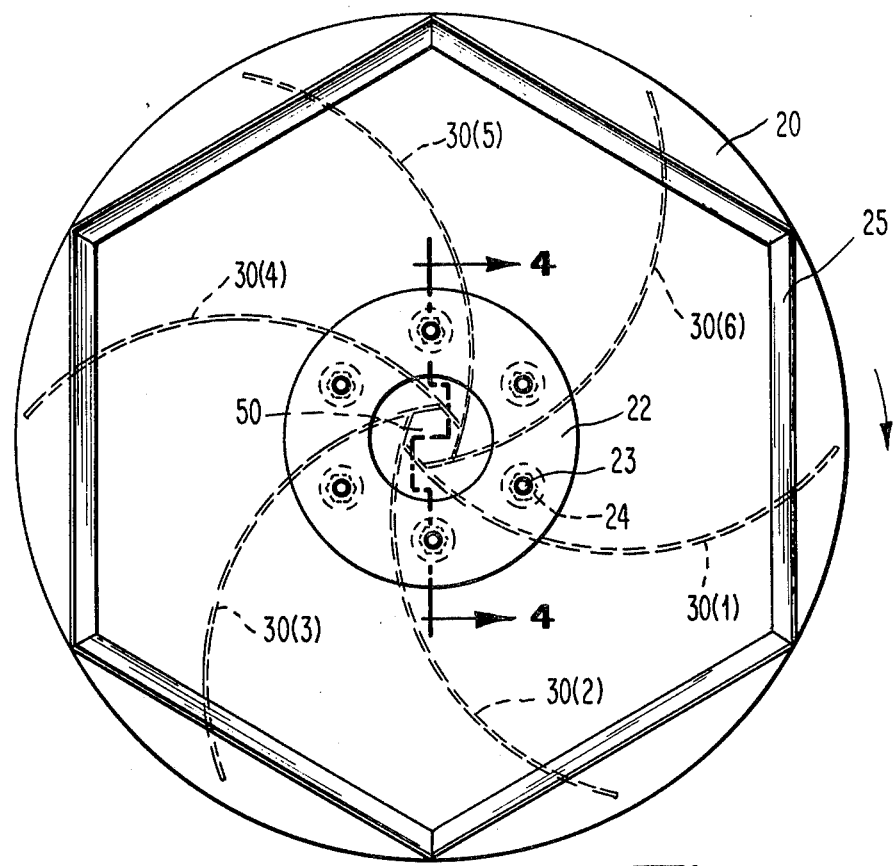
FIG. 1 is a top plan view of one form of surface aerator impeller according to the present invention.
Figure 2:
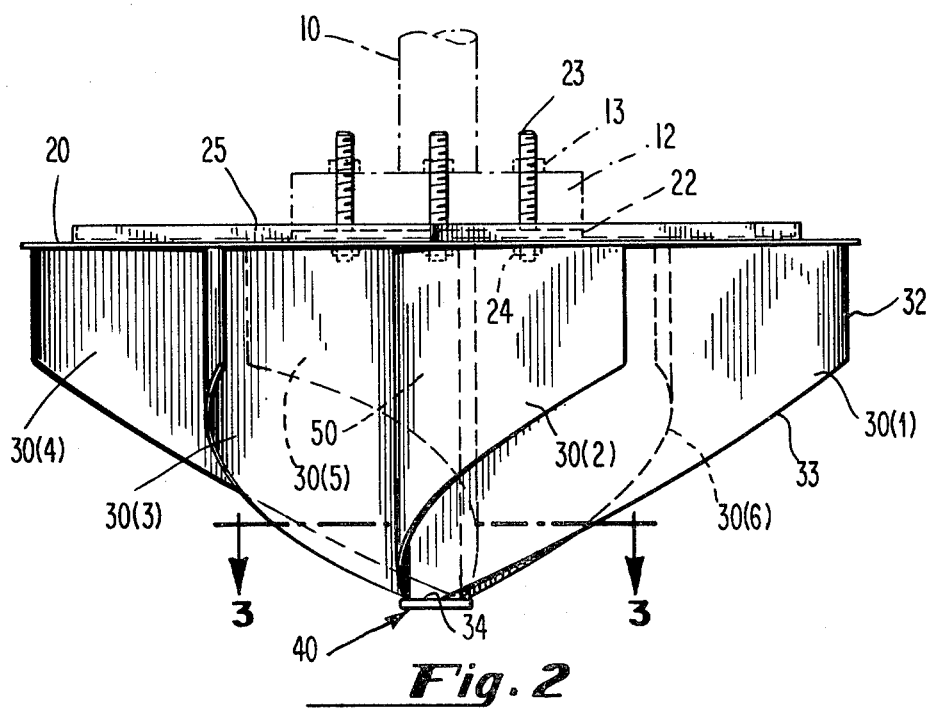
FIG. 2 is an elevational view of the impeller of FIG. 1.

The impeller of FIGS. 1-4 is secured, as by studs 23, to a flange 12 of a vertical rotatable drive shaft 10. In FIG. 2, the drive shaft 10 and its flange 12 are shown in phantom. The vertical position of the impeller is adjustable as by means of shims inserted between flange 12 and the top of the impeller.

The impeller of FIGS. 1-4 comprises a solid steel disc 20 having a diameter which is large relative to that of the drive shaft 10 and its flange 12. The steel disc 20 may be relatively thin in thickness, as for example, one-quarter to one-half inch. Secured, as by welds 21, to the upper surface of disc 20, in a position concentric therewith, is an annular steel disc 22 having a thickness substantially greater than that of upper disc 20, as for example, one and one-quarter inch. In the particular example illustrated, six studs 23 are inserted through holes provided in registry with one another in disc 20 and annular disc 22. The studs 23 are secured in place, as by bottom nuts 24, which are then welded, as by welds 25, to the undersurface of upper disc 20. Studs 23 project upwardly and are adapted to be received in holes in a flange 12 of a drive shaft 10 and secured as by nuts 13, shown in phantom. To adjust the vertical position of the impeller, shims may be inserted between the flange 12 and the disc 22. The connection just described is but one of a variety of connections that might be used to drive the impeller and provide it with vertical adjustability.

Positioned beneath upper disc 20, and secured to the undersurface thereof, as by welding, are a plurality of equally-spaced curved blades 30. Six such blades are illustrated but it will be understood that some other number of blades, for example, eight blades, could be employed. In the form shown in FIGS. 1-4, the blades 30 are curved rearwardly, i.e., in a backward direction relative to the direction of rotation which is clockwise as viewed in FIGS. 1 and 3.

As seen best in FIG. 2, the bottom edge 33 of each blade 30 is sloped downwardly from its relatively short vertical outer edge 32 toward its long vertical inner edge 31. The innermost portion of bottom edge 33 is, however, horizontal so as to be adapted to be welded to the upper surface of an annular flange portion 41 of a small lower tie plate 40. To aid in the reading of FIG. 2 of the drawing, each of the six blades 30 has been identified by an individual sub-number indicated in parenthesis, as for example, 30(1) or 30(4). In FIG. 2, the innermost horizontal portion of the bottom edge 33 of blade 30(1) is identified 34 and is seen resting on the annular flange 41 of lower tie plate 40.

Figure 3:
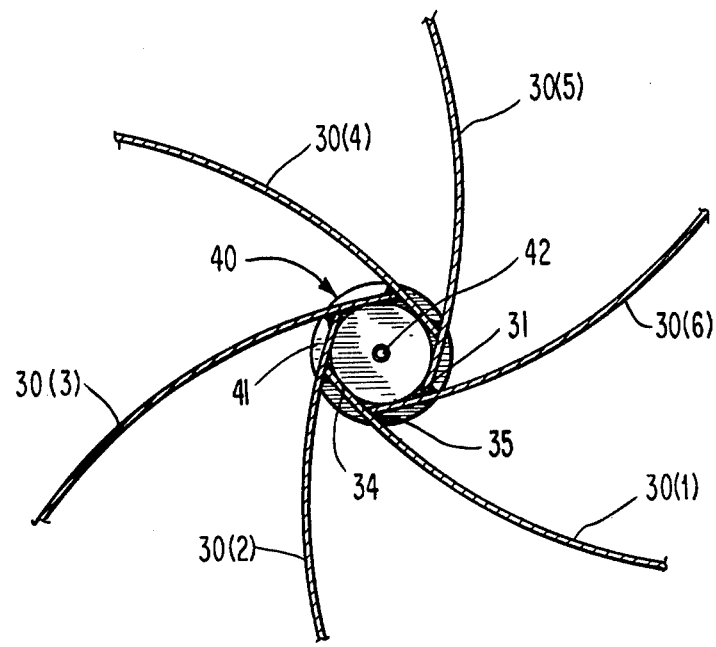
FIG. 3 is a view, in section, looking down along the line 3—3 of FIG. 2.
Figure 4:
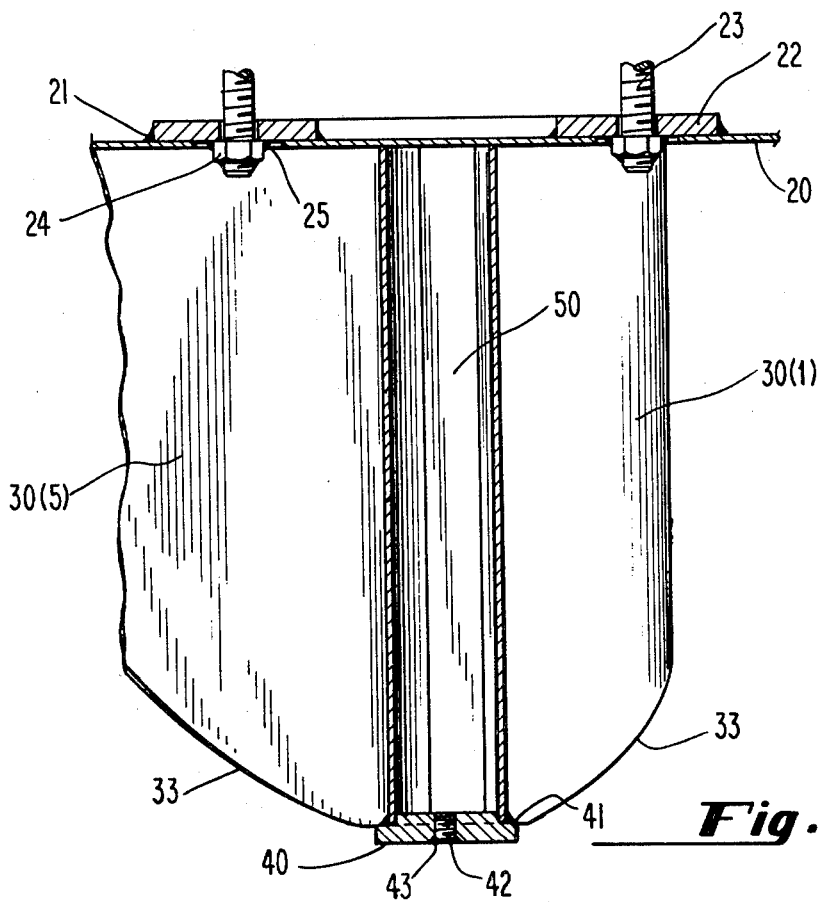
FIG. 4 is an elevational view, broken away, looking along the line 4—4 of FIG. 1.

In accordance with the present invention, the backward curved blades 30 are so disposed that their vertical inner edges 31 are off the center axis of the rotating structure, being forward thereof relative to the direction of rotation, as is best seen in FIGS. 1 and 3. It will be seen from FIG. 3 that the vertical inner edge 31 of each blade 30 abuts against the next adjacent blade which is forward thereof and is welded thereto by a continuous weld 35 which extends from the flange 41 of lower tie disc 40 to the undersurface of upper disc 20. The horizontal portion 34 of the bottom edge 33 of each blade 30 is welded to the upper surface of annular flange 41. This horizontal portion 34 extends between adjacent vertical welds 35, as viewed in FIG. 3. The welding together of blades 30 forms a closed hollow water-tight chamber 50 having a cross-sectional configuration which, in the six-blade impellers, is hexagonal.

Upper disc 20 is preferably reinforced to improve its rigidity. Such reinforcement may take the form of six angle irons 25 disposed in hexagonal configuration and welded to the upper surface of disc 20, as seen in FIG. 1.

The impeller whose construction has just been described may be said to be of the shrouded or closed turbine type. It is inserted into the water or other liquid until the surface of the liquid is (approximately) at the level of upper disc 20. The large diameter upper disc 20 functions as a structural member to support the backward curved blades 30.

Disc 20 also acts as a discharge deflection device to give a discharge trajectory which is long and low and substantially free of mist. The retreating curved blade with the offset configuration gives a low shear-to-flow characteristic. This provides for a minimum amount of fine droplet formation as a result of shear, as well as a low total power consumption characteristic for a given amount of voiumetric discharge.

As has been described, the bottom edge of the retreating curved blades are sloped at an angle downwardly inwardly. Thus, the vertical inner edge of the blade extends downwardly to a substantially lower level than does the vertical outer edge of the blade. This configuration tends to provide constant blade "swept volume" at any point radially out from the center of the impeller to the discharge at the outer edge. This feature helps to minimize liquid velocity variation within the impeller and helps to avoid cavitation and vortexing.

Furthermore, since the discharge from each individual blade is naturally a simple spiraling plume, in order to maximize the available gas-liquid contacting space above the liquid surface, a substantial number of blades should be used. It was found that 6 or 8 blades give the most desirable discharge configuration, creating almost a uniform thin-film umbrella out of the individual spiraling plumes. The specific shape of the discharge configuration varies somewhat with the relative position of the impeller to the liquid surface, with high liquid levels giving a flatter trajectory.

While the curvature of the backward-curved blades 30 may vary within a range, a preferable radius of curvature is equal to approximately one-third of the overall diameter of the impeller.

In order to realize the high percentage reduction in power consumption which is desired, the backward-swept curved configuration of the blade 30 must be coordinated with an offset of the inner end of the blade from the axis of rotation. This construction gives a further reduced angle of attack which reduces the shear rate and energy consumption. The offset of the blade curvature in front of the axis of rotation should be between 3 percent and 6 percent of the impeller diameter in order to realize the optimum power response reduction. A configuration which has a blade curvature which passes through the axis of rotation, or which falls within a zone which includes the axis of rotation, will not provide the reduction in power consumption which is achieved by the offset configuration shown and described hereinabove.

The vertical height of the blades at the outer tip may vary, and would depend at least somewhat upon the variation in liquid level that the impeller is designed to tolerate. In general, the height of the vertical outer edge of the blade should probably be between one-fifth and one-eight of the impeller diameter in order to achieve optimum pumping capacity per unit of horsepower.

The combination of blade curvatures indicated above, and offset within the ranges indicated, for a substantial number of blades, such as six or eight, in combination with a large diameter upper supporting disc, and sloping bottom edges of the blades, creates an hydraulic discharge characteristic which gives very uniform load dissipation and eliminates the shock load characteristic which has been typical of prior art surface aerator impeller design. In fact, the radial discharge efficiency of a surface aerator impeller having a construction according to the present application is so good that no observable mass rotation of the tank content has resulted when operating in a square or rectangular basin, and in such basins there is minimized need to provide for discharge-straightening baffles in combination with the aerator. Such discharge-straightening baffles have been required and used on prior art designs to avoid gross rotation and gross vortexing.

When, however, the surface aerator impeller built according to the present invention is mounted centrally in a cylindrical tank, it is recommended that anti-vortex baffles be used since use in a cylindrical tank introduces an obvious problem of gross rotation of the tank contents and the subsequent centrifugal force vortexing which is associated with such a set-up when operating in a low viscosity liquid, such as water or activated sludge.

Without intending to be limited to the following dimensions, it may be noted that impellers have been built according to the present invention having the following dimensions: The upper disc is one-quarter inch thick and has a diameter of 100 inches. The annular disc which is welded to the upper surface of the upper disc is 1¼ inches thick and has an outside diameter of 35 inches; its center hole has a diameter of 18 inches. The lower tie plate is 1½ inches thick and has an outside diameter of 7¾ inches; its flange is ¾ inch wide and has a height of 1 inch. The impeller blades are one-quarter inch thick and have an overall diameter of 97 inches. The radius of curvature of the blades is 33 7/16 inches. The length of the upper edge of the curved blade is 59¾ inches. The length of the vertical inner edge of the blade is 42⅛ inches, and the length of the vertical outer edge is 14⅜ inches. The angle of downward inclination of the bottom edge of the blade is 26.7 degrees from the horizontal. The inclination or slope of the bottom edge may vary; it should probably be within a range between 25 and 40 degrees as measured on the original flat plate of the blade prior to rolling the blade into its curved shape.

The aerator impeller of FIGS. 1–4 is satisfactory for single speed operation and represents an improvement over prior art aerator impellers. However, it is sometimes necessary to meet customer specifications which require that by a combination of variations of speed and liquid level the impeller shall be capable of a specified variation in motor horsepower drawn without exceeding an allowed percentage reduction of oxygen transfer per horsepower-hour.

To meet specifications of the type referred to above, the impeller must be capable of operation at two speeds while meeting the horsepower and oxygen transfer requirements at a specified range of impeller submergence. The form of impeller shown in FIGS. 5–6 has been tested and proven to have the necessary capability to meet specifications requirements of the type suggested above.

Figure 6:
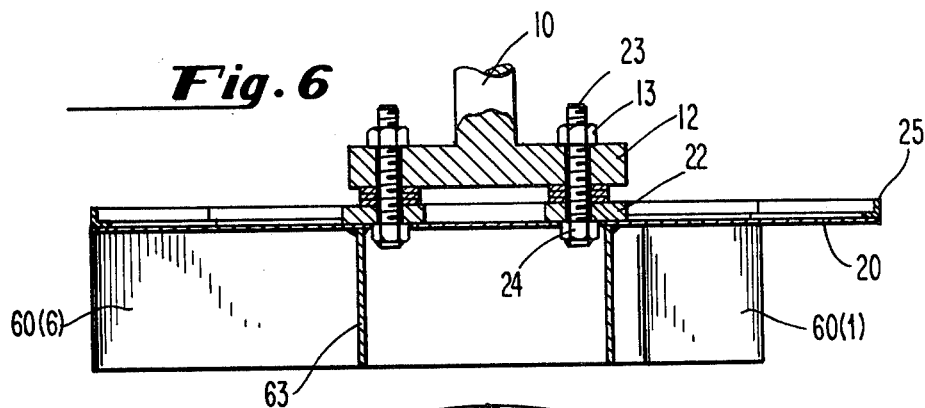
FIG. 6 is an elevational view looking along the line 6—6 of FIG. 5.
Figure 5:
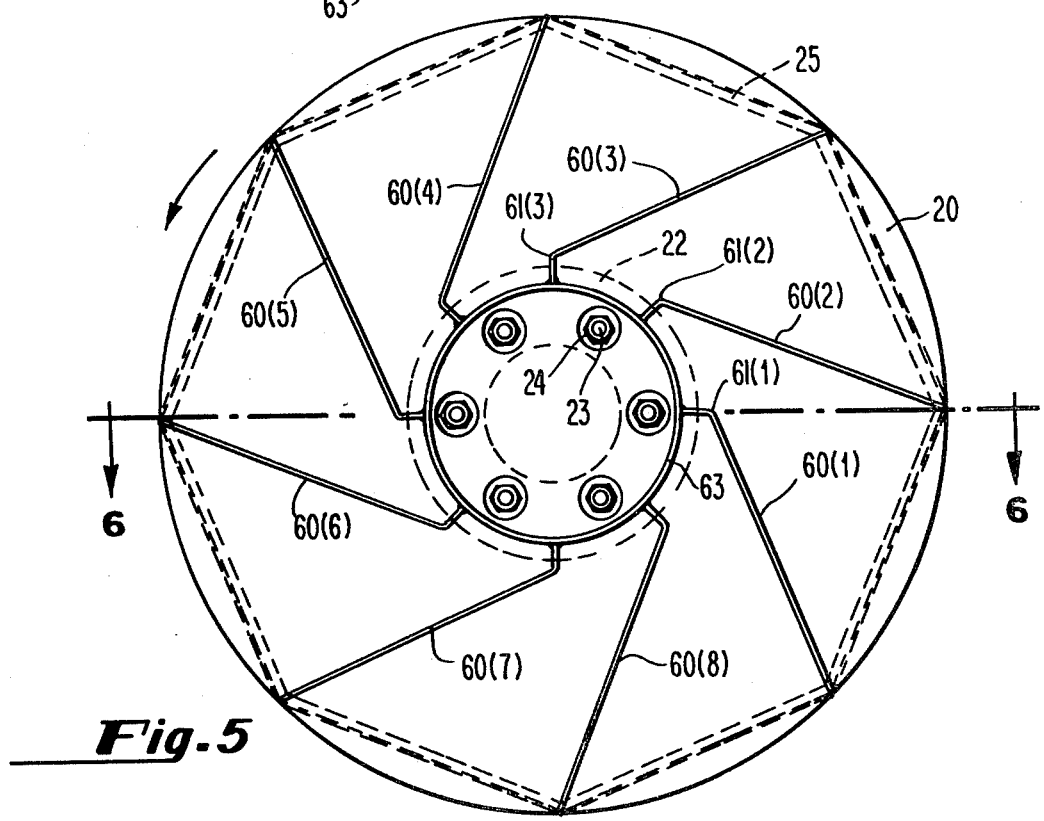
FIG. 5 is a bottom view of another form of surface aerator impeller according to the present invention. The impeller of FIG. 5 is a preferred form where two-speed operation at different levels of impeller submergence is required.

The impeller of FIGS. 5–6 is similar to the impeller of FIGS. 1–4 in that it has a circular upper disc 20 to the underside of which the plurality of blades are secured, as by welding, at uniform angular spacing about the center of rotation of the disc. As in the impeller of FIGS. 1–4, the disc 20 of the impeller of FIGS. 5–6 has secured to its upper surface an annular steel disc 22 through which a plurality of bolts 23 are passed for the purposes of securing the impeller to the flange 12 of a drive shaft 10. The vertical position of the impeller is adjustable, as by placing one or more C-shims 27 between the flange 12 and the annular disc 22.

The impeller of FIGS. 5–6 differs from the impeller of FIGS. 1–4 in the shape and size of the impeller blades. In the impeller of FIGS. 5–6, a plurality of eight blades are illustrated, identified 60(1) through 60(8), but some other number of blades could be used. Each of the blades is secured, as by welding, to the underside of disc 20. Each of the blades is also welded to a control hollow steel cylinder 63 which is welded concentrically to the undersurface of disc 20. Each of the blades 60(1) through 60(8) has a major area portion which is rectangular in shape and is flat, lying in a single vertical plane. Each blade also has a short minor area portion at its inward end formed by the blade being bent, as at 61(1), 61(2), 61(3), etc. The short position lies along a radial, and its inward end is secured, as by welding, to the hollow steel cylinder 63.

In the impeller illustrated, the larger major area portion of each blade lies at an angle, preferably 115°, to its own short radial portion, and at an angle of 20° to the radial portion of the next following blade. The bent form of blade just described is dictated by construction requirements. So far as operation is concerned, each blade could be flat throughout its entire area with its inner edge off the center axis of the disc 20 in the forward direction relative to the direction of rotation of the impeller.

Figure 7:
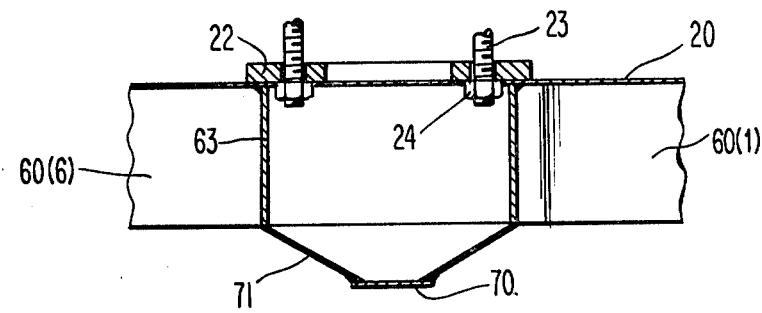
FIG. 7 is a fragmentary elevational view of a slightly modified form of impeller similar of that of FIGS. 5-6.

FIG. 7 represents a slight modification of the impeller of FIGS. 5–6, the difference being that instead of the hollow steel cylinder 63 being open at the bottom it is closed by a bottom disc 70 and a conical portion 71 which is welded to the disc 70 and to the cylinder 63.

Figure 10:
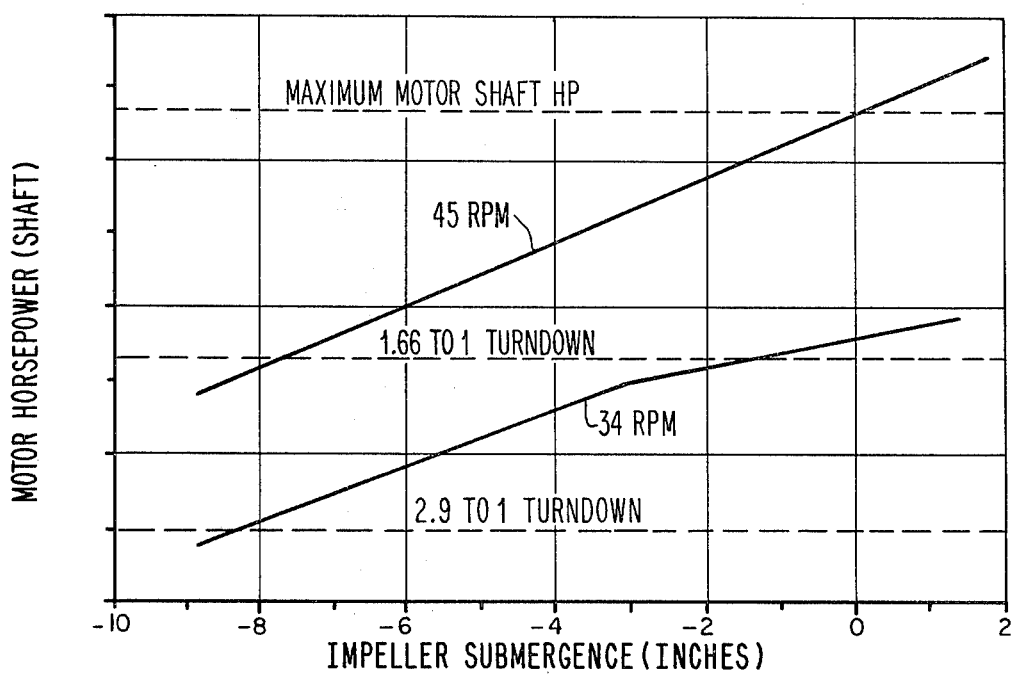
FIGS. 10 and 11 are graphs indicating some of the operating characteristics of the form of impeller shown in FIGS. 5-6.
Figure 11:
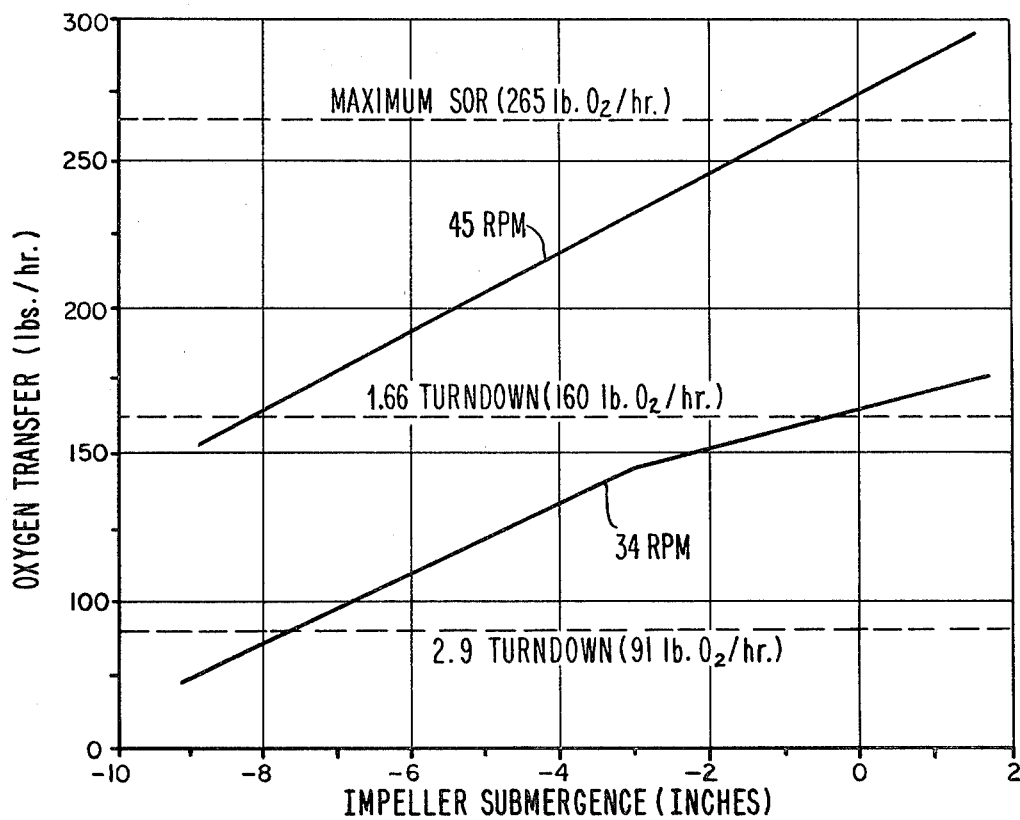

FIGS. 10-11 are graphical representations which indicate the capability of the impeller of FIGS. 5-6 to meet illustrative customer specifications and requirements. Graphs are shown for two motor shaft speeds, a high speed of 45-rpm and a low speed of 34-rmp. The 45-rpm graph in FIG. 10 shows that the impeller of FIGS. 5-6 is capable of meeting a customer requirement that the horsepower drawn by the impeller shall be variable over a 1.66-to-1 range for an eight-inch change in liquid level without more than a ten percent reduction of oxygen transfer per horsepower-hour. It will be seen from FIG. 10 that as the impeller is changed from zero submergence (where the flat upper disc 20 is at the liquid level) to a submergence of minus eight-inches (where the impeller disc 20 is eight-inches above the liquid level) the reduction is horsepower is in a ratio of 1.66-to-1. FIG. 11 shows that a 45-rpm when the impeller is changed from zero submergence to a submergence of minus eight-inches (i.e. is eight-inches out of the liquid) the oxygen transfer in pounds per hour changes in a ratio of 1.66-to -1.

In FIGS. 10-11, the lower graphs, representing operation at 34-rpm, show the capability of the impeller of FIGS. 5-6 to meet a customer requirement that by combination of speed (45-rpm and 34-rpm) and an eight-inch liquid-level variation, the impeller shall be capable of at least 2.9-to-1 variation in motor horsepower drawn without more than a ten percent reduction in oxygen transfer per horsepower-hour, and that the entire power range be covered with overlap of both power and oxygen. FIG. 10 indicates that at 34-rpm the horsepower drawn is reduced in a ratio of 2.9-to-1 going from zero submergence to minus eight inches. In FIG. 11, the 34-rpm line shows the same 2.9-to-1 horsepower ratio change between zero submergence and a submergence of minus eight inches. It will be seen from the graphs of FIGS. 10-11, that the impeller of FIGS. 5-6 has met the illustrative customer requirements referred to above.

Figure 8:
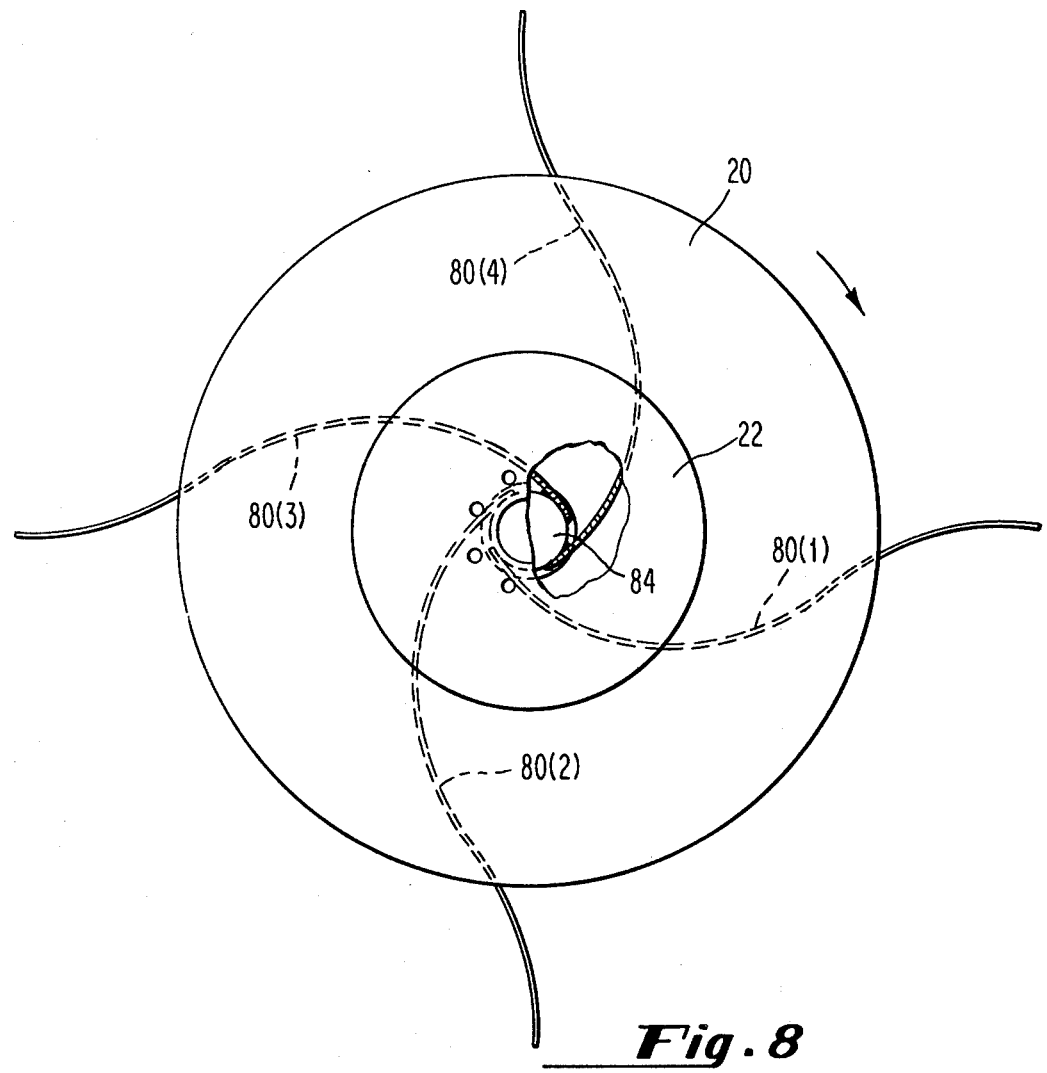
FIG. 8 is a plan view, partly broken away, of a third form of impeller.
Figure 9:
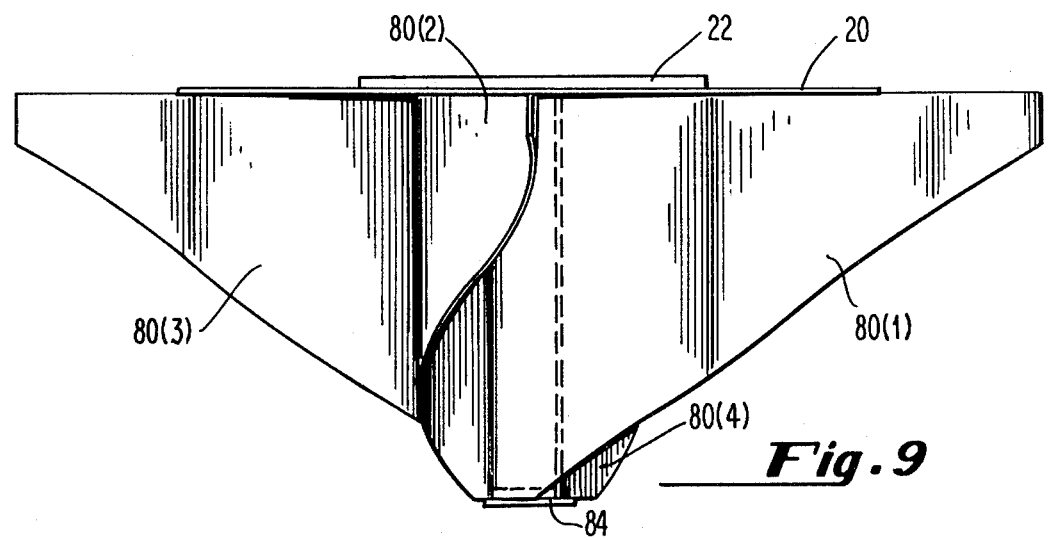
FIG. 9 is an elevational view of the impeller of FIG. 8.

FIG. 8-9 illustrate yet another form of impeller which in certain respects in similar to the impeller of FIGS. 1-4 and in other respects is different. The impeller of FIGS. 8-9 is similar in that it has an upper disc 20 having a plurality of impeller blades welded to its undersurface. The impeller is also similar in that an annular steel disc 22 is secured to the upper surface of the disc 20, and in that disc 22 has holes therethrough for receiving bolts for securing the impeller to a vertical drive shaft.

The impeller of FIGS. 8-9 is different from the impeller of FIGS. 1-4 in that the shape of the impeller blades is different. In FIGS. 8-9, four impeller blades are shown identified 80(1) to 80(4), but some other number of blades could be used. Each of the blades has a reverse curvature. The inward portion of the blade is curved in a retreating direction relative to the direction of rotation of the impeller, which as viewed in FIG. 8, is indicated by the arrow to be clockwise. The outer portion of each blade is curved in a forward direction relative to the direction of rotation. Moreover, the outer forwardly-directed portion extends well beyond the limit of the disc 20 to the undersurface of which the blades are secured. In one embodiment, disc 20 has a diameter of 70 inches, while the overall diameter of the impeller is 102 inches. In other words, each blade projects 16 inches beyond the edge of the upper disc 20. The lower edge of each of the blades 80(1) to 80(4) is inclined upwardly outwardly except for the inwardmost part of the lower edge which is horizontal and which is secured to a lower plate 84. As seen in the broken-away part of FIG. 8, the inward vertical edge of each of the blades 80(1) to 80(4) stops short of the face of the next preceding blade.

It will be understood that where sizes and dimensions have been given in the foregoing description, they are illustrative and informative, but not limiting unless so indicated.

While the upper disc 20 has been shown as a solid disc, and while this is its preferred form, the disc 20 may, in some cases, be provided with slots or other discontinuities between the hub and the outer periphery of the disc.

What is claimed is:

1. A surface aerator impeller for aeration of liquids, said impeller comprising:
    (a) a large flat horizontal upper disc;
    (b) means adapted for securing said disc to the lower end of a vertical rotatable drive shaft for rotation therewith about the center axis of said disc;
    (c) a plurality of uniformly-shaped vertical impeller blades the upper edges of which are secured throughout their length to the underside of said disc at uniformly angular spacings about the center axis of said disc;
    (d) each blade having inner and outer vertical edges;
    (e) each blade being bent along a vertical line spaced from but relatively close to said inner vertical edge, forming each blade into minor and major flat portions disposed in planes angularly disposed relative to each other, said minor flat portion lying in a radial plane, said major flat portion extending in a retreating direction relative to the direction of rotation of said disc;
    (f) said major flat portion being flangeless and rectangular in shape.

2. Apparatus according to claim 1 wherein said means for securing said disc to the lower end of a vertical rotatable drive shaft includes means for adjusting the vertical level of said impeller disc.

3. Apparatus according to claim 1 wherein:
    (a) a hollow cylinder is secured in concentric position to the underside of said upper disc;
    (b) the inner vertical edges of said blades are secured to said cylinder.

4. Apparatus according to claim 3 wherein the bottom end of said hollow cylinder is closed by a conical portion and a bottom disc of smaller diameter than said hollow cylinder.

* * * * *